(12) United States Patent
Cathcart et al.

(10) Patent No.: US 8,366,429 B2
(45) Date of Patent: Feb. 5, 2013

(54) VENTED MOLD AND METHOD FOR PRODUCING MOLDED ARTICLE

(75) Inventors: Allan K. Cathcart, Kendal (CA); Leslie E. Clarke, Cambridge (CA); Larry A. Genyn, Mississauga (CA); Louie J. Meneses, Windsor (CA); Randall J. Lansue, Belleville, MI (US)

(73) Assignee: Proprietect LP (CA)

( * ) Notice: Subject to any disclaimer, the term of this patent is extended or adjusted under 35 U.S.C. 154(b) by 0 days.

(21) Appl. No.: 12/894,716

(22) Filed: Sep. 30, 2010

(65) Prior Publication Data

US 2011/0020483 A1    Jan. 27, 2011

Related U.S. Application Data

(60) Division of application No. 12/335,312, filed on Dec. 15, 2008, now Pat. No. 7,878,785, which is a continuation of application No. 10/973,985, filed on Oct. 27, 2004, now Pat. No. 7,481,637.

(60) Provisional application No. 60/570,075, filed on May 12, 2004.

(51) Int. Cl.
*B29C 44/02* (2006.01)
*B29C 44/60* (2006.01)

(52) U.S. Cl. .................. 425/140; 425/4 R; 425/812

(58) Field of Classification Search .................. 425/4 R, 425/127, 546, 812, 817 R, 140, 146
See application file for complete search history.

(56) References Cited

U.S. PATENT DOCUMENTS

| | | | | |
|---|---|---|---|---|
| 4,782,886 | A | * | 11/1988 | Uchida et al. ................ 164/305 |
| 4,874,308 | A | * | 10/1989 | Atlas et al. ................... 425/544 |
| 4,987,947 | A | * | 1/1991 | Ozeki et al. .................. 164/305 |
| 5,614,226 | A | * | 3/1997 | Kiefer ............................ 425/112 |
| 6,352,423 | B1 | * | 3/2002 | Babiarz et al. ............... 425/110 |
| 2002/0100860 | A1 | * | 8/2002 | Wieder ......................... 249/141 |
| 2003/0047830 | A1 | * | 3/2003 | Ito et al. ...................... 264/46.4 |
| 2005/0181087 | A1 | * | 8/2005 | Hayward et al. ............. 425/139 |

* cited by examiner

*Primary Examiner* — Joseph Del Sole
*Assistant Examiner* — Ryan Ochylski
(74) *Attorney, Agent, or Firm* — Katten Muchin Rosenman LLP

(57) ABSTRACT

The invention relates mold, particularly a mold for producing foam articles. In a preferred embodiment, the mold comprises a lid and a bowl releasingly engageable to define a mold cavity, the lid comprising: (i) a vent having a passageway for gas to escape from the mold cavity, and (ii) a plurality of grooves connected to the vent. The use of a plurality of grooves/slots in the mold cavity surface effectively acts as a siphon to draw gas away from the composition to be molded. The plurality of grooves/slots is connected to one or more vents which then allows for escape of the gas from the mold cavity to the exterior of the mold.

13 Claims, 14 Drawing Sheets

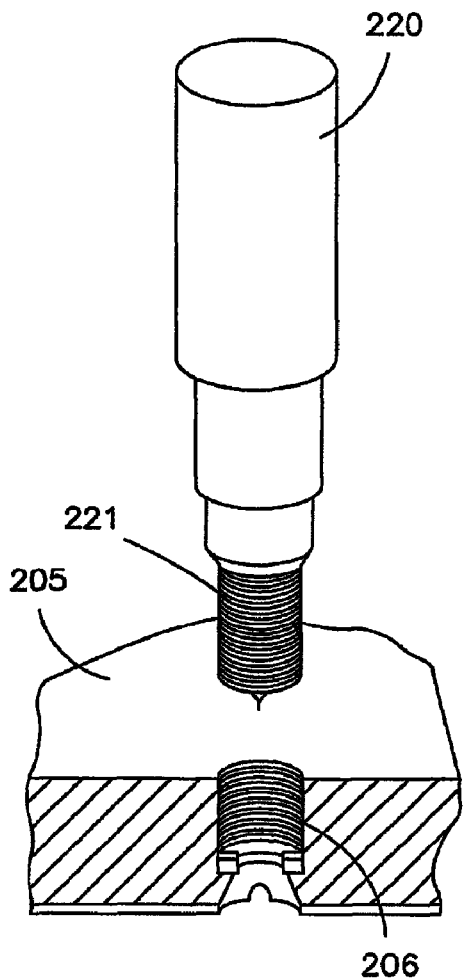
FIG. 19
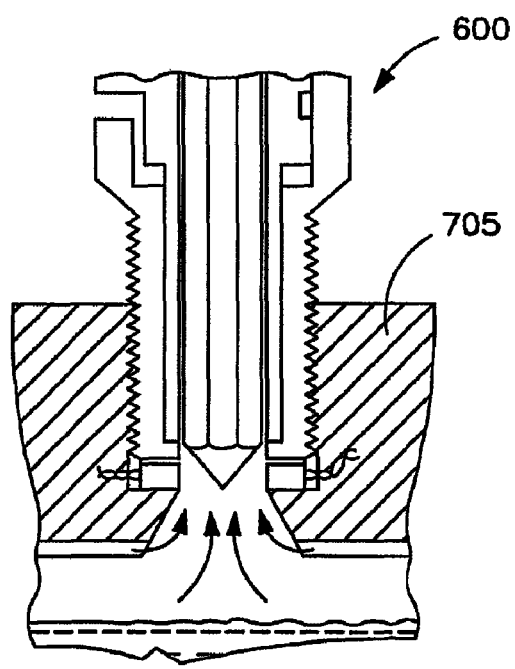
FIG. 20
FIG. 24
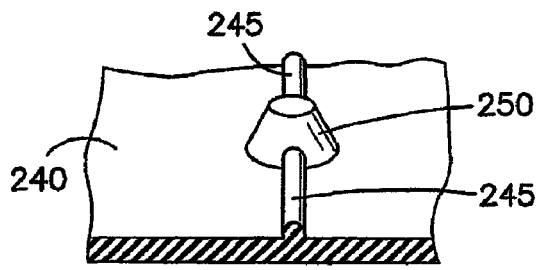
FIG. 29
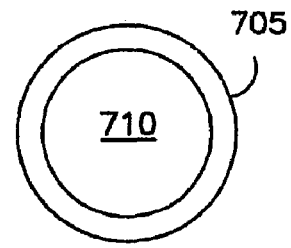
FIG. 22

VENTED MOLD AND METHOD FOR PRODUCING MOLDED ARTICLE

CROSS-REFERENCE TO RELATED APPLICATIONS

The present application is a divisional application claiming the benefit under 35 U.S.C. §120 of U.S. patent application Ser. No. 12/335,312, filed Dec. 15, 2008, which claims the benefit of U.S. patent application Ser. No. 10/973,985, filed Oct. 27, 2004, now U.S. Pat. No. 7,481,637, which claims the benefit under 35 U.S.C. §119(e) of provisional Patent Application Ser. No. 60/570,075, filed May 12, 2004, the contents of all are incorporated herein by reference.

BACKGROUND OF THE INVENTION

1. Field of the Invention

The present invention relates to a vented mold and to a method for producing a molded article.

2. Description of the Prior Art

Many articles are manufactured by placing a raw material into a cavity in a mold wherein the raw material undergoes a physical change (e.g., it expands or foams) and the article produced thus acquires the shape of the cavity. In particular, this technique is commonly employed for producing foamed articles made from polymeric foams such as polyurethane foam, latex (e.g., natural and styrene-butadiene rubber) foam and the like.

For example, automotive seats are commonly manufactured from polyurethane cushions which are molded to shape and then covered with a vinyl, cloth or leather finish cover (also known as a "trim cover"). Polyurethane foams are somewhat unique in that foaming and at least a portion of the polymerization process occur simultaneously. Thus, in the production of polyurethane foam using, for example, a conventional cold foam technique, a typical formulation comprises:

1. Polyol
2. Water
3. Tetramethyl ethane diamine
4. Dimethyl ethanol amine
5. Polyisocyanate The mixture is dispensed into a mold using a suitable mixing head, after which the mold is then closed to permit the expanding mass within it to be molded. Accordingly, it is convenient generally to refer to the mixture initially dispensed into the mold as "a liquid foamable polymeric composition" or, in this case, "a liquid foamable polyurethane composition". As the composition expands in the mold, polymerization occurs and the polymer so formed becomes solidified.

When molding a liquid foamable polymeric composition to form articles, such as polyurethane foam articles, it is conventional to use a clam-shell mold comprising a bottom mold and a top mold which, when closed, define a mold cavity. The mold is opened, the liquid foamable polyurethane composition is dispensed into the mold cavity and the mold is closed as a chemical reaction causes the composition to expand. After the mold is closed, the composition expands to fill the interior cavity of the mold. Alternatively, the composition may be dispensed into a closed mold. In either case, as the polymerization reaction is completed, the foam cures and permanently assumes the shape of the mold cavity.

As is known to those of skill in the art, it is important during this process that the mold be adequately vented to allow the air present in the mold to exit the mold as the foamable composition expands. Further, it is important to allow a portion of the gases (typically $CO_2$ in the production of polyurethane) generated during polymerization to exit the mold.

Failure to adequately vent the mold results in defective molded articles exhibiting symptoms of improper foaming such as surface hardening (or foam densification) and/or void formation in the finished article due to trapped gas or air bubbles. At the other extreme, excess venting of the mold will also result in defective molded articles due to collapse of the foam prior to curing; this phenomenon is often referred to as the 'soufflé' effect. Thus, proper venting of a mold is an important factor in producing molded articles of acceptable quality.

Typically, first generation clam-shell molds have been designed with drilled or cut passages in the top mold to provide vents. Locating, sizing and deciding upon the number of these vents is a matter of some skill on the part of mold designer and the production engineers, and is often an iterative procedure with more vents being added to various locations or other vents being blocked-off after test runs have been made.

During molding operations some liquid foamable polymeric composition which moves into the vent is wasted. It is generally desired to minimize the amount of wasted material (also known as "flash", "mushrooms", "buds", "pancakes" and the like) for two reasons, namely (1) the wasted material adds to the overall expense of chemicals required to produce the finished article, and (2) the wasted material must be removed from the molded article prior to the finish cover being applied, thereby necessitating additional labour and the costs associated therewith.

As will be developed below, improvements to venting during such molding operations have advanced the art to a certain degree. However, mold designers and production engineers are continually striving to optimize the compromise between providing enough venting at the proper locations while avoiding excess venting and minimizing material wastage during venting and the number of vents needed to achieve adequate venting of the mold cavity. Further, as will be developed below, notwithstanding advances in the art pertaining to venting, there is still a problem with molded articles, particularly those made of polyurethane foam. Specifically, there is the problem of foam collapse (referred to above) and with voids and/or underfill which will be described in more detail below. Thus, there is an ongoing need in the art to improve venting techniques to solve the problem of foam collapse, voids and/or underfill.

SUMMARY OF THE INVENTION

It is an object of the present invention to obviate or mitigate at least one of the above-mentioned disadvantages of the prior art.

Accordingly, in one of its aspects, the present invention provides a mold for producing molded articles, the mold comprising a first mold and a second mold releasingly engageable between an open position and a closed position, the closed position defining a mold cavity, a surface of the mold cavity comprising at least one groove connected to at least one vent, the at least one vent comprising a passageway for gas to escape from the mold cavity.

In another of its aspects, the present invention provides a mold for producing molded articles, the mold comprising a lid and a bowl releasingly engageable to define a mold cavity, the lid comprising: (i) a vent having a passageway for gas to escape from the mold cavity, and (ii) a plurality of grooves connected to the vent.

In yet another of its aspects, the present invention provides a device for producing molded articles, the device comprising a lid and a bowl releasingly engageable between an open position and a closed position, the closed position defining a mold cavity, at least one of the lid and the bowl comprising: (i) a plurality of vents, each vent having a passageway for gas to escape from the mold cavity, and (ii) a plurality of interconnected grooves arranged to be in fluid communication with the plurality of vents.

Other aspects of the present invention relate to the production of a molded part, preferably a molded foam part, using the above molds and device.

Thus, the present inventors have discovered a new approach to improving venting of mold, particularly molds for production of foam articles. The approach is quite different from that used in the past.

The conventional approach of venting involved placement of a number of vents in areas of a mold where it was believed localized collection of gas would occur in the mold cavity. In many cases, placement of vents was done in an iterative manner. Specifically, as foam parts were made and surface defects were seen, the response would be simply to place a vent (e.g., one or both of a so-called "autovent" and "ribbon vent" discussed below) in the area of the mold corresponding to the position of the defect on the resulting foam part. The result was the provision of a large number of vents (40 or more) at the parting line of the mold and/or in the top mold or lid of the mold. Even following this approach, the occurrence of foam collapse and voids has not been overcome and the occurrence of underfill is only marginally better, in part due to the (wrong) assumption that the location of the defect in the final product is coterminous with the location of the gas to be vented during foam expansion.

The approach used by the present inventors is to de-emphasize location of a great number vents in potential areas of concern in the mold. Rather, the present inventors have discovered that the use of one or more grooves/slots in the mold cavity surface effectively acts as a siphon to draw gas away from the composition to be molded. The at least one groove and/or slot is connected to one or more vents which then allows for escape of the gas from the mold cavity to the exterior of the mold.

In a highly preferred embodiment, the one or more grooves/slots are provided in a so-called network or grid-like orientation to cover a substantial portion of the surface of the mold cavity as a web (e.g., a substantial portion of the surface of the mold cavity corresponding to the B-surface of the finished part). This allows for the use of significantly fewer vents and for de-emphasis on precise location of the vents in each potential area of concern in the mold cavity. Equally or more importantly, the provision of such a groove and/or slot, preferably in the network or grid-like fashion described herein, results in the significant advantage of production of molded articles that are free of the problem of foam collapse, voids and/or underfill.

A number of other advantages accrue from the use of one or more grooves/slots in the mold cavity surface effectively as a siphon to draw gas away from the composition to be molded and to channel this gas to one or more vents. These advantages include:

It is possible to produce foam parts having relatively low density while obviating and/or mitigating the risk of occurrence of foam collapse. Previously, one approach to manage the risk was to design the chemistry of the foamable composition to result in a relatively high density product. The potential to produce relatively low density products using the venting approach described herein would result in lighter weight products—this would be highly advantageous in vehicular applications given the increasing cost of fuel.

It is possible to introduce heterogeneous elements to the composition to be molded while obviating and/or mitigating the risk of occurrence of foam collapse. For example, if a liquid foamable composition is dispensed in the mold cavity, the heterogeneous element might be one or more of a foam insert element (e.g., to produce a dual-hardness/firmness or multiple-hardness/firmness foam product) or a non-foam insert (e.g., a portion of a touch fastener system (also know as a Velcro™ fastener), a mechanical clip, a cloth insert and the like). Previously, the nature, size and/or position of such a heterogeneous element has been relatively limited owing to the risk of foam collapse.

It is possible to solve collectively the problems of foam collapse and the occurrence of underfill and voids in the foam product.

It is possible to significantly reduce the number of vents need to achieve adequate venting of the mold. This provides savings in capital costs and in maintenance. Further, the ability to use significantly fewer vents creates a predictable environment around the vents (and the mold). This creates the potential to manage the environment around the vents (and the mold) in a manner which obviates and/or mitigates uncontrolled release gas from the mold.

The one or more grooves/slots in the mold cavity surface are effectively self-cleaning in that, after gases are vented from the mold, the mold cavity is filled and the resulting product is demolded with a "negative" of the one or more grooves/slots (e.g., in the form of one or more ridges). There is little or no fouling of grooves/slots either by the moldable composition and/or by any mold release agents initially sprayed on the mold cavity surfaces to facilitate demolding. Avoiding fouling by mold release agents is particularly advantageous since such agents are regularly used in the art and would be expected to be applied to the one or more grooves/slots.

The use of one or more grooves/slots is active for siphoning or otherwise channeling gas (e.g., via a capillary effect) in the mold cavity as the internal pressure in the mold remains relatively low. The grooves and/or slots are connected to a vent which maybe a ribbon vent, an autovent or a so-called smart vent.

It is preferred to have the one or more grooves/slots disposed in a "high point" of the lid of the mold since this will facilitate drawing of the gas from the top of the geometric feature which is to be vented. It also highly preferred to orient a slot/groove on the periphery of the mold cavity near the parting line. This peripheral groove/slot can be disposed in the lid or the bowl of the mold and depends, in part, of the shape of the article being produced.

The approach of using grooves/slots is particularly applicable in a situation where the part to be molded is highly contoured. Thus, the groove/slot maybe disposed on the high point of a contour surface as discussed above and/or the tangent of radius of the edge or lip of a contour in the mold.

When a peripheral groove/slot is used as described above, it is preferred to include one or more so-called connection grooves/slots to interconnect the peripheral groove/slot with, for example, a ribbon vent.

For the surfaces of the mold cavity that are relatively flat, it is preferred to orient a number of grooves/slots in a network or grid-like fashion to provide a substantial checkerboard arrangement of grooves/slots with each square in the checkerboard having an area in the range of from about 4 in² to about 16 in². Of course, where the major surface of the mold cavity is slightly contoured, the grid may not necessarily need to contain grooves/slots arranged to define precise squares.

In the event that the part to be produced is somewhat elongate, it is preferred to run a number of grooves/slots lengthwise on the surface of the mold cavity and couple this with pour pattern generally at one end of the mold cavity. By dispensing the foam composition at one end of the mold cavity, the foam needs to travel lengthwise to fill the mold cavity and this allows lengthwise orientation of the grooves/slots to run ahead of foam flow reliably moving gas from the mold cavity to the vent and out of the mold.

As will be discussed below, it is possible to have one or more "mini" or isolated networks or grid-like orientation of grooves/slots to deal with highly contoured or raised sections of the mold cavity.

It is also highly preferred to have one or more groove/slots oriented in a manner whereby the groove/slots have redundant paths to a number of vents disposed in the lid and/or parting line of the mold.

BRIEF DESCRIPTION OF THE DRAWINGS

Embodiments of the present invention will be described with reference to the accompanying drawings, wherein like reference numerals denote like parts, and in which:

FIG. 19 is an enlarged perspective view of installation of a vent in the present mold;

FIG. 20 illustrates an enlarged sectional view of a vent in the present mold;

FIG. 22 is a sectional view along line XXII-XXII in FIG. 21;

FIG. 24 illustrates a sectional view along line XXIV-XXIV in FIG. 23;

FIG. 29 illustrates an enlarged perspective view of a foam product made using the vents illustrated in FIGS. 20-28.

DETAILED DESCRIPTION OF THE PREFERRED EMBODIMENTS

The most preferred liquid foamable polymeric composition is based upon polyurethane, which will be referred throughout this specification. However, it will be apparent to those of skill in the art that the present invention is applicable to other types of molding operations including, but not limited to, latex foam, neoprene foam, PVC foams and the like.

A first generation prior art mold will first be discussed, with reference to FIGS. 1 and 2, and a second generation prior art mold will then be discussed, with reference to FIGS. 3 and 4.

Figure 1:
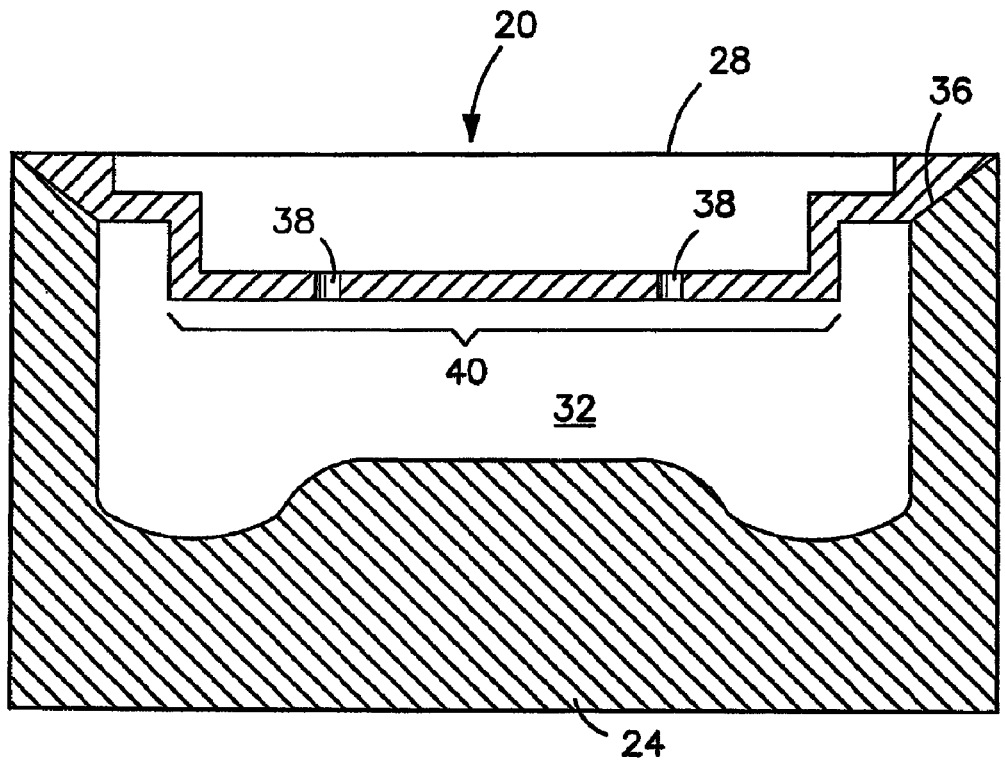
FIG. 1 illustrates a sectional view of a prior art mold.
Figure 2:
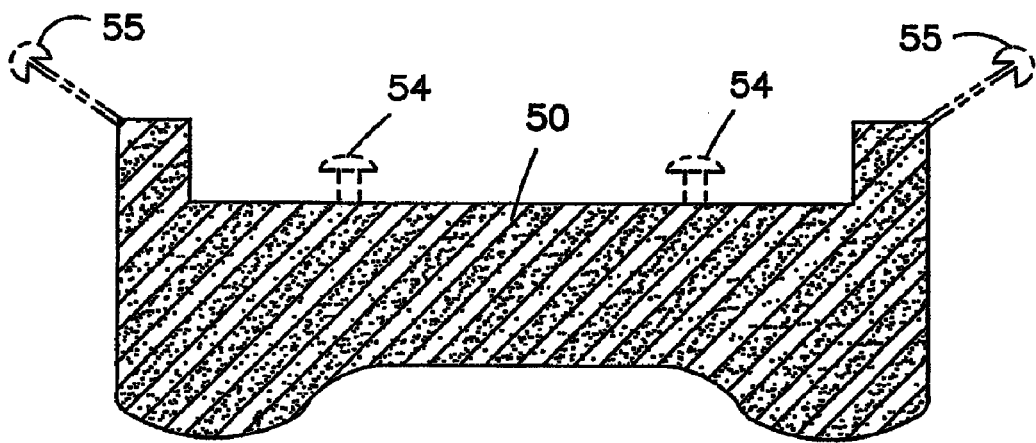
FIG. 2 illustrates a sectional view of a foam product made using the mold illustrated in FIG. 1.

With reference to FIGS. 1 and 2, a typical clam-shell mold, similar to those used for forming an automotive seat cushion from polyurethane foam, is indicated generally at 20 in FIG. 1. Mold 20 includes a lower mold 24 (also known in the art as a "bowl") and an upper mold 28 (also known in the art as a "lid") which are joined by a conventional hinge or other means (not shown). Lower mold 24 and upper mold 28, when closed, define a cavity 32 which corresponds to the shape of the automotive seat cushion.

In use, upper mold 28 is released from lower mold 24 and a pre-determined amount of liquid foamable polyurethane composition is dispensed into lower mold 24. Upper mold 28 and lower mold 24 are closed and engaged to seal the mold, and the liquid foamable polyurethane composition expands, displacing the air within cavity 32. This displaced air exits cavity 32 through a relatively large parting line vent 36 and through one or more top vent passages 38 in upper mold 28. Further, as the polyurethane composition expands, polymerization of the composition occurs along with the evolution of gaseous $CO_2$ in cavity 32. This gaseous $CO_2$ may also exit cavity 32 through parting line 36 and through top vent passages 38. As is well known to those of skill in the art (and beyond the scope of this discussion), the liquid foamable polymeric composition eventually completely polymerizes and cures, acquiring the shape of cavity 32.

As is also known to those of skill in the art, the amount of liquid foamable polyurethane composition dispensed in cavity 32 must be selected to ensure that cavity 32 will be substantially completely filled, in order to avoid the occurrence of underfill-associate foam collapse, voids and other foaming defects in the molded article. While the determination of the proper amount of liquid foamable polyurethane composition for a particular mold may generally be calculated, when using a first generation mold such as mold 20, it has been required to dispense an excess amount of polymeric composition into the mold to compensate for material which moves through and exits parting line vent 36 and top vent passages 38. This excess, while assisting in ensuring that cavity 32 is filled to avoid the occurrence of underfill-associate foam collapse, voids and other foaming defects in the molded articles, is in fact simply a wastage of valuable raw material which must be laboriously removed in a further post-production step.

In these first generation prior art molds, during the molding operation, air and the reaction gases produced from the expanding composition exit from cavity 32 through parting line vent 36 and top vent passages 38 until the foam reaches the level of their respective entrances.

At this point, any further expansion of the foam results in movement of the foam into parting line vent 36 and/or top vent passages 38. In the simplest case of a cavity without irregularities, the foam reaches the level of the parting line vent and/or the vent passages at approximately the same time, which usually occurs at or near the maximum expansion point of the foam. Thus, provided that the proper amount of liquid foamable polyurethane composition has been dispensed into the cavity, only a small amount of foam enters the parting line vent and/or the vent passages as cavity 32 is completely filled.

In practice, however, as shown in FIG. 1, most molds include irregularities in their cavities for various features required on the molded article. In such a case, the thickness and shape of cavity 32 typically varies across the cavity and the entrance to parting line vent 36 and top vent passages 38 in the mold may thus be located at different heights depending upon where they communicate with cavity 32. Further, localized areas of varying pressure also occur within cavity 32 due to the manner in which the foam and the gases produced collect in and move between the irregularities therein and thus the level of expanding foam mass in different parts of cavity 32 at different times may vary.

Due to the above-mentioned factors, the foam in the cavity typically reaches the level of the parting line vents and/or different vent passages at different times while the foam is still expanding. For example, in a region wherein the top of cavity 32 is lower than surrounding regions, such as indicated at 40 in FIG. 1, the foam may quickly reach the top vent passages 38. As the foam is still rising in the rest of cavity 32 and has not yet cured, a relatively significant amount of foam may enter top vent passages 38 in this region.

Again, as the amount of foam which enters parting line vents 36 and top vent passages 38 reduces the amount of foam remaining in cavity 32 by a like amount, it is necessary that the amount of liquid foamable polyurethane composition placed in cavity 32 include an amount in excess of that required to fill cavity 32 to offset the foam which entered the parting line and vents. This excess amount, while necessary for proper operation of the prior art mold, is essentially wasted material which must be laboriously removed in a further post-production step and thus adds to the cost of forming the article.

Further, as shown in FIG. 2, the foam which enters top vent passages 38 forms "mushrooms" 54 (shown in ghosted line) of wasted material on the molded article 50. Further, the material which enters parting line vents 36 forms "pancakes" 55 of wasted material on the molded article 50. Typically, mushrooms 54 and pancakes 55 must be disconnected from article 50 and removed from the mold 20 prior to application of a finish cover to ensure a finished covered article which is of acceptable appearance and texture, and to prepare mold 20 for re-use. The necessity of removing mushrooms 54 and pancakes 55 results in an increased labour cost associated with manufacturing the molded product.

In addition to the excess liquid foamable polyurethane composition which is added to offset the material extruded into the vents, excess liquid foamable polyurethane composition is also added to compensate for process variations due to changes in temperature, humidity, ambient pressure and minor changes in the composition of the liquid foamable polyurethane composition. Accordingly, in these first generation prior art molds, the wastage of material exiting the vents is inevitable.

In U.S. Pat. Nos. 5,356,580 (Re. 36,413), 5,482,721 (Re. 36,572) and 5,587,183 [collectively referred to as "the Clark et al. patents"], there is disclosed a second generation mold. The second generation mold taught by the Clark et al. patents replaces parting line vents 36 in FIG. 1 described hereinabove with improved parting line vents. These improved parting line vents are highly efficient vents that achieve the bulk of venting of the mold cavity. The second generation mold taught by the Clark et al. patents replaces top vent passages 38 of FIG. 1 described hereinabove with an improved top vent system. As is known in the art, top vent systems are needed to vent isolated regions (i.e., from the parting line vents) of the mold cavity. With references to FIGS. 3 and 4 hereof, a discussion of the operation this improved top vent system second generation mold will follow.

Figure 3:
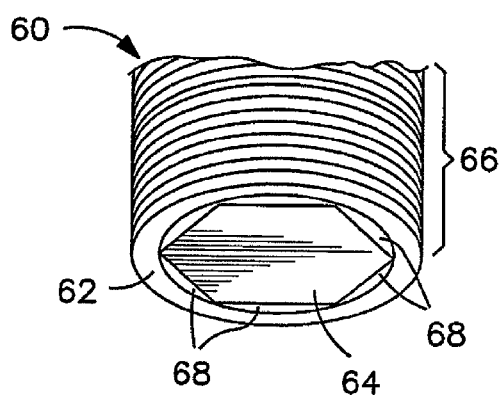
FIGS. 3 and 4 illustrated an enlarged perspective view of a portion of a prior art vent device.
Figure 4:
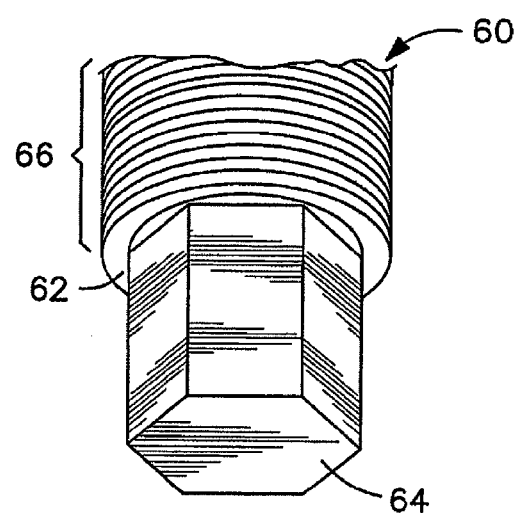

With reference to FIGS. 3 and 4, a top vent system 60 is illustrated. Top vent system 60 comprises a cylindrical bore 62 and a relief pin 64 disposed within cylindrical bore 62. The exterior of cylindrical bore 62 comprises a threaded portion 66 which engages a complementary threaded portion of the mold (not shown). In the illustrated embodiment, the portion of relief pin 64 nearest the opening of cylindrical bore 62 is hexagonal in cross-section. The six points of the hexagonal cross-section of relief pin 64 are in engagement with cylindrical bore 62 and define six segment-shaped vent passages 68. The proximal end (not shown) of relief pin 64 comprises a cross-section complementary to cylindrical bore 62. An opening (not shown) is provided between the distal end and the proximal end (not shown) of relief pin 64 to allow gases entering vent passages 68 to exit top vent system 60.

Top vent system 60 is incorporated in a mold such as mold 20 (FIG. 1) where it would replace each of vent passages 38. In use, liquid foamable polyurethane composition is dispensed into cavity 32, and lower mold 24 and upper mold 28 are sealingly engaged. The air in cavity 32 and the gases produced by the chemical reaction occurring in the expanding composition are vented through vent passages 68. The viscosity of these gases are such that they flow relatively easily through vent passages 68. Once the level of foam in mold 20 reaches the entrance to vent passages 68, the foam enters vent passages 68. Due to the presentation of a restriction by vent passages 68 to the expanding composition, the latter can only move slowly through vent passages 68. Provided that the thickness of vent passages 68 has been properly selected, the liquid foamable polymeric composition will stop moving therein before it travels a significant distance along the vents and before it the exit opening (not shown) of top vent system 60.

Once expansion of the foaming mass is complete, the foam article produced is demolded from mold 20. This is achieved by opening lower mold 24 and upper mold 28 and removing the foam article from lower mold 24. During mold opening, any foam material which has expanded in vent passages 68 will be torn from the foam article. Such torn material results in blockage of vent passages 68 and thus, must be removed prior to reuse of mold 20. This is achieved by sliding relief pin 64 toward and extending it out of the distal end of cylindrical bore 62 (FIG. 4). As described in the Clark et al. patents, this sliding operation results in the proximal end (not shown) of relief pin 64 (i.e., having a cross-section complementary to cylindrical bore 62) sweeping out of cylindrical bore 62 any foam material blocking vent passages 68.

Figure 5:
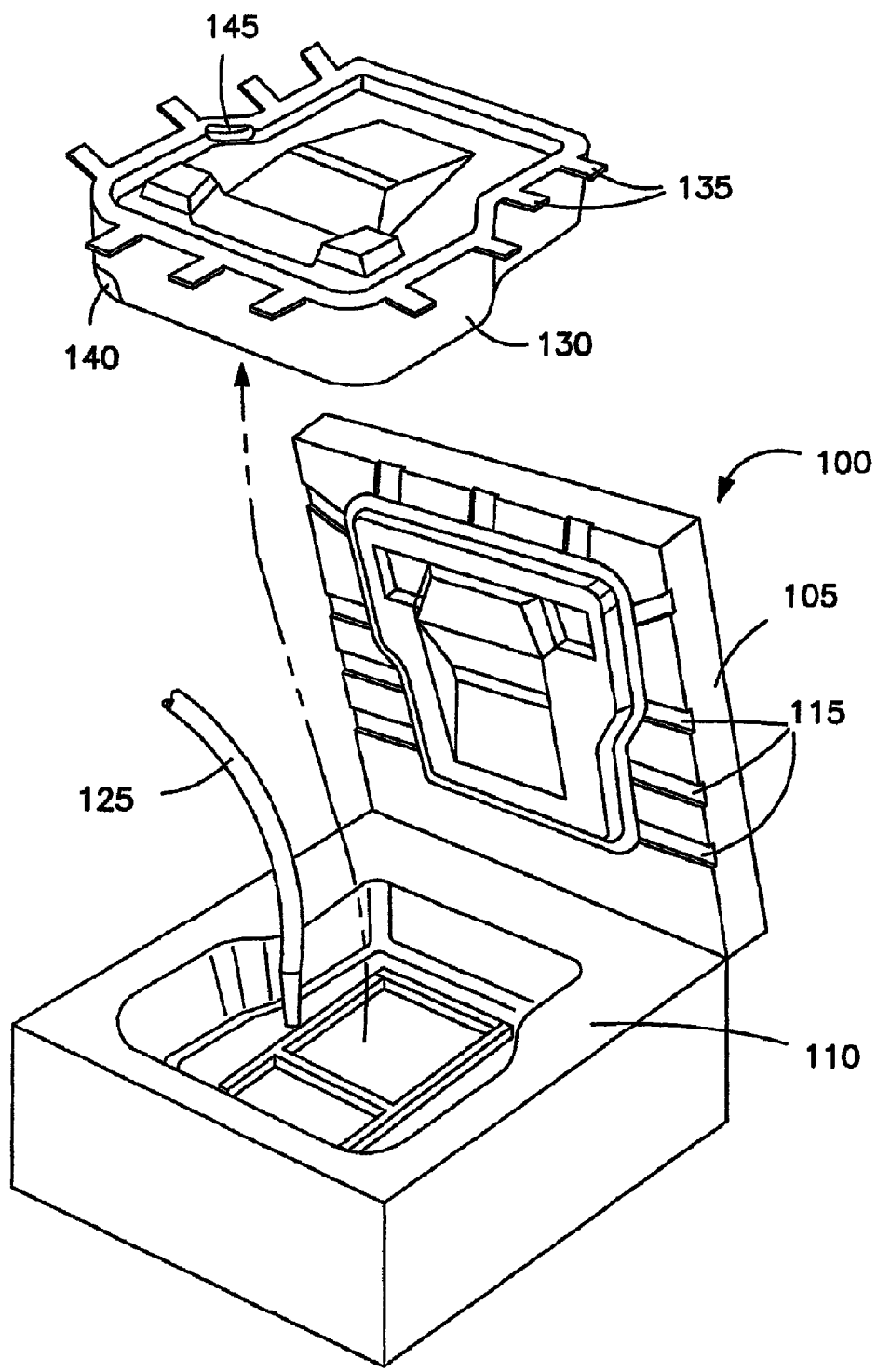
FIGS. 5 and 6 illustrate production of a molded article in a prior art mold.
Figure 6:
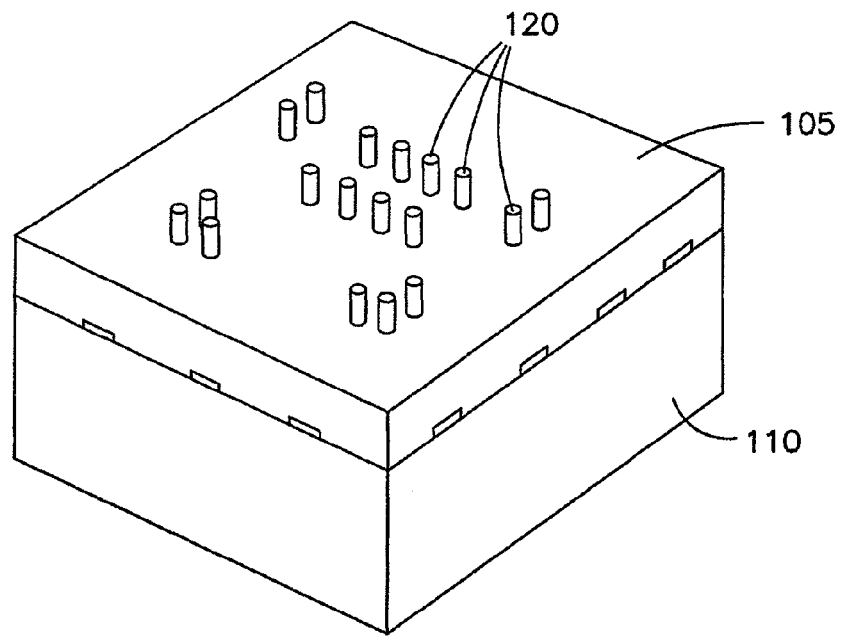
Figure 7:
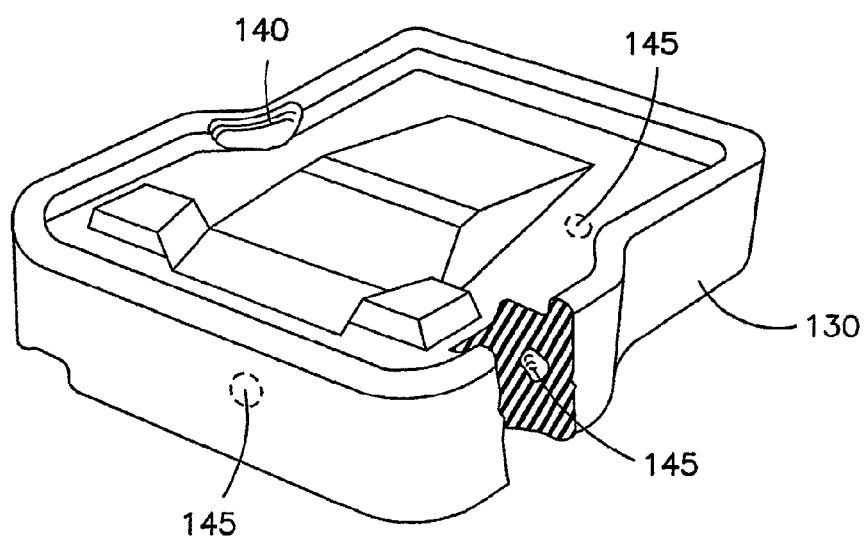
FIG. 7 illustrates a perspective view of a foam article made using the prior art mold illustrated in FIGS. 5 and 6.

With reference to FIGS. 5-6, there is illustrated operation of a mold 100 similar to that taught by the Clark et. al patents. Thus, mold 100 comprises a lid 105 and bowl 110 which is realisably engageable with lid 105. Lid 105 includes a series of parting line or so-called "ribbon vents" disposed therein.

Also disposed in lid 105 are a series of so-called autovents 120 similar to those taught by the Clark et. al patents.

In use, a foamable composition (not shown) is disposed in bowl 110 via a dispenser 125. Lid 105 is then closed and the flowing mass is allowed to fill the mold cavity. Thereafter, lid 105 is swung open and a foam part 130 is removed from mold 100. Foam part 130 comprises a series of foam ribbons 135 which need not be trimmed and can simply be folded back during application of a trim cover to form part 130.

Despite the advances made in the art by the teachings in the Clark et. al patents, there are situations where the quality of the product is less then desirable.

Specifically, as discussed above, there are two defects which are seen from time to time: voids and underfill. Underfill is a surface phenomenon which manifests itself in foam product 130 in the form of surface cavities 140. Further, the formation of voids 145 within foam element 130 ("subsurface voids") and on the surface of foam element 130 (not shown—"surface voids") is another problem. Surface voids tend to be manifested in the foam product as a localized area of the foam part that has not been formed—e.g., the foam composition does not expand to completely occupy a highly contoured section of the mold lid such that the resulting foam part is missing a section corresponding to the void. In conventional molding techniques, lid 105 is used to mold the so-called B-surface of the foam part whereas the surface of bowl 110 is used is use to mold the so-called A-surface of foam part 130. While surface cavities 140 can occur on any surface of foam element 130, they can be regularly present under the B-surface of foam element 130. It has been conventional in the art to respond to observation of underfill surface cavities 140 by placement of another autovent 120 in the area of lid 105 corresponding to the location of void 140.

In the result, for a single mold, it has become commonplace to use on the order of 40 (or more) vents made up of ribbon vents 115 and autovents 120 in a single mold 100. Even with provision of such a larger number of vents, appearance of underfill surface cavities 140 and voids 145 (surface voids or subsurface voids) still occurs.

The present inventors have adapted a completely different approach to improving venting of gas formed as the foaming mass fills the mold cavity.

Specifically, the present inventors have discovered that it is not necessary to have such a large number of vents nor is it necessary to rely on such vents for venting a localized portion of the mold cavity. Thus, the present inventors have discovered that one or more grooves (or slots) in the surface of the mold cavity can be used as a conduit to funnel, draw, siphon, etc. gas to be vented to a conventional vent without the need to place a vent in each area where gas is expected to be vented.

In a highly preferred embodiment of the invention, these grooves or slots are disposed in a intersecting or a grid-like fashion combined with provision of at least one such groove/slot in the periphery of the mold cavity. These groove/slot function as siphons (e.g. via a capillary effect) to facilitate removal of gas from the mold cavity.

Thus, in a preferred embodiment, the venting approach in the present mold relates to use of previous local vents as effective area vents by disposing a plurality of grooves/slots in the mold cavity surface. The capacity of these grooves/slots to transport gas effectively is a function of the interaction with the natural growth of the rising foam, the thickness of the area in which the grooves/slots are contained and the obstruction effect of the geometries in the path to the vents. Thus, the grooves-slots are effective for channeling gas to be vented to a vent.

As will be developed further below, it is possible to connect this network or grid-like arrangement of grooves/slots to conventional vents such that those taught in the Clark et. al patent. The improvement is a significant reduction in the number of vents required to achieve proper venting and the ability to produce parts which are substantially free of voids and underfill—the provision of such parts is a particularly significant advantage of the present invention.

Figure 8:
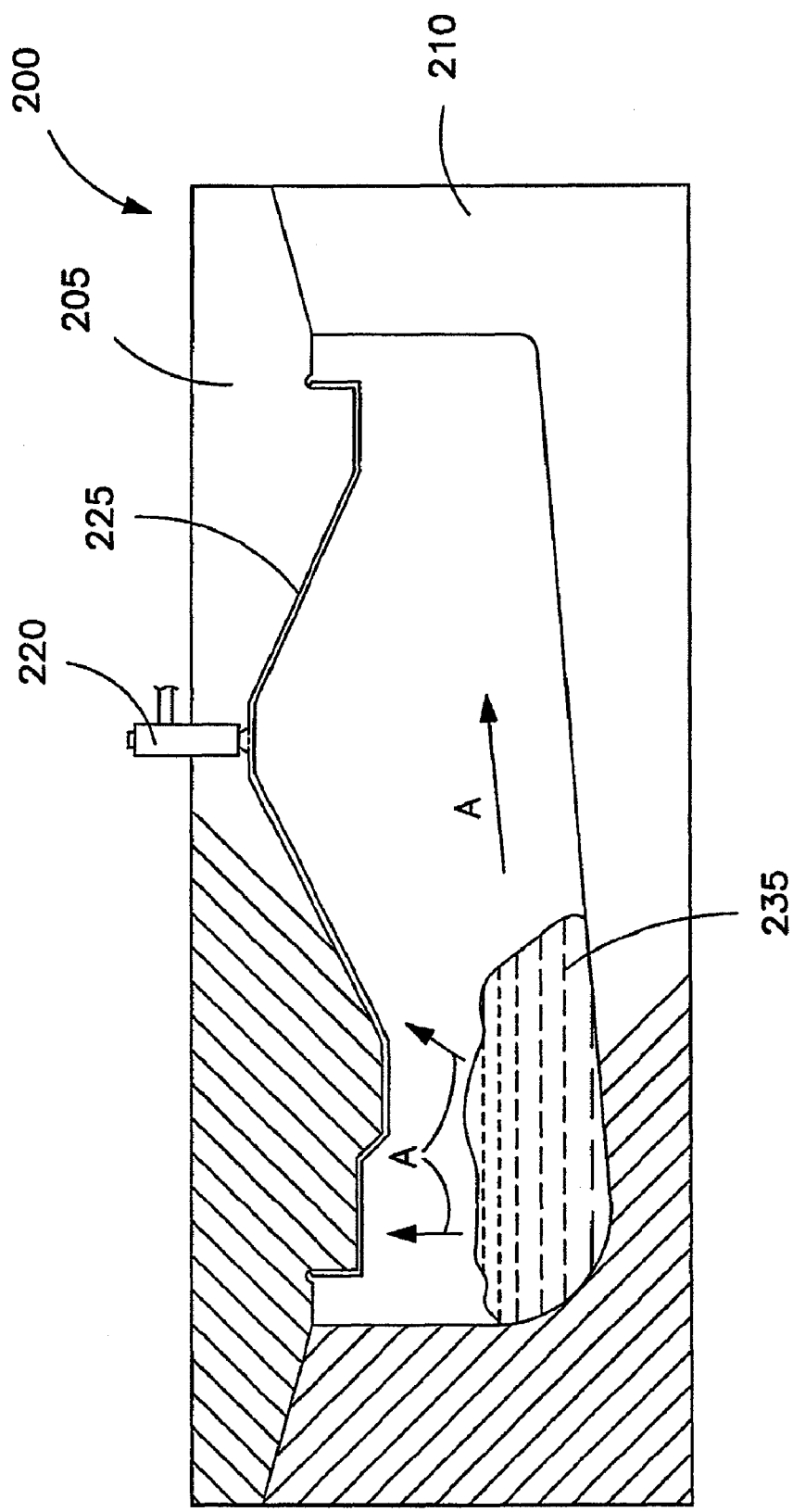
FIG. 8 illustrates a sectional view of a preferred embodiment of the present mold shown during production of a molded article.

With reference to FIG. 8, there is illustrated a mold 200 comprising a lid 205 and a bowl 210 which are releasably engageable in a manner similar to that described above with respect to mold 100. Four vents 220 are disposed in lid 205. Also disposed in lid 205 is a network 225 of grooves. Network 225 extends to a peripheral portion 230 of the mold cavity.

Figure 9:
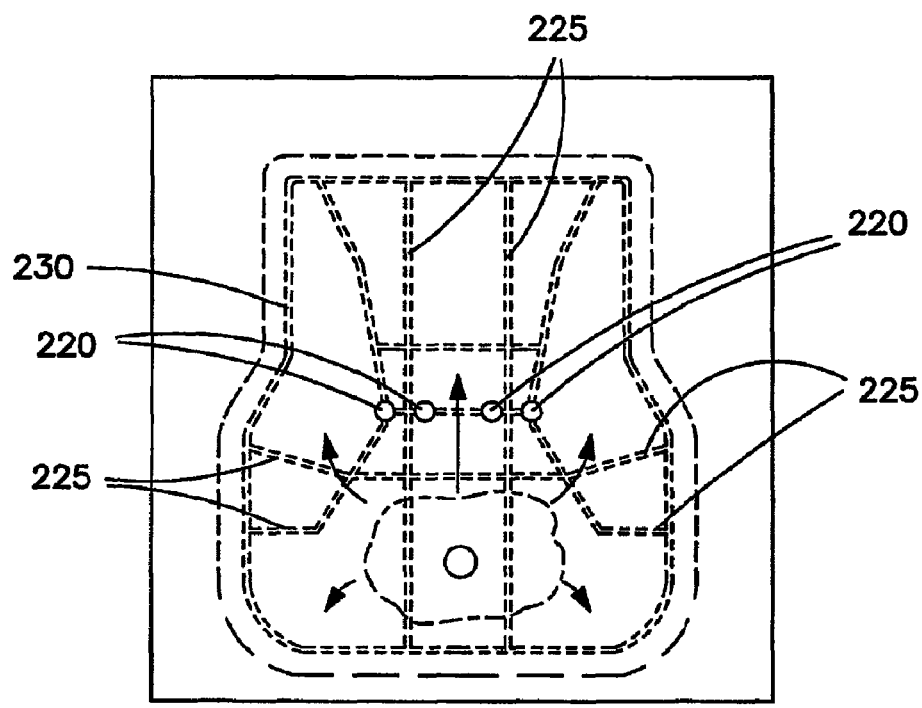
FIG. 9 illustrates a top view of the mold illustrated in FIG. 8, partially ghosted to show the contents of the mold.

As can be seen with reference to FIG. 9, network 225 is connected to vents 220.

With further reference to FIG. 8, once a liquid formable composition 235 is dispensed into mold 200, composition 235 expands in the direction of arrows A. During this process, gas is produced and the pressure in mold cavity increases. The grooves/slots in network 225 are effectively disposed ahead of foam flow and are reliable to channel or funnel gas toward vents 220 even though vents 220 are not disposed throughout the entire surface of lid 205. The drawing out of gasses produced during expansion is facilitated by placement of vents 220 at or near the peak of the contours in lid 205.

Figure 10:
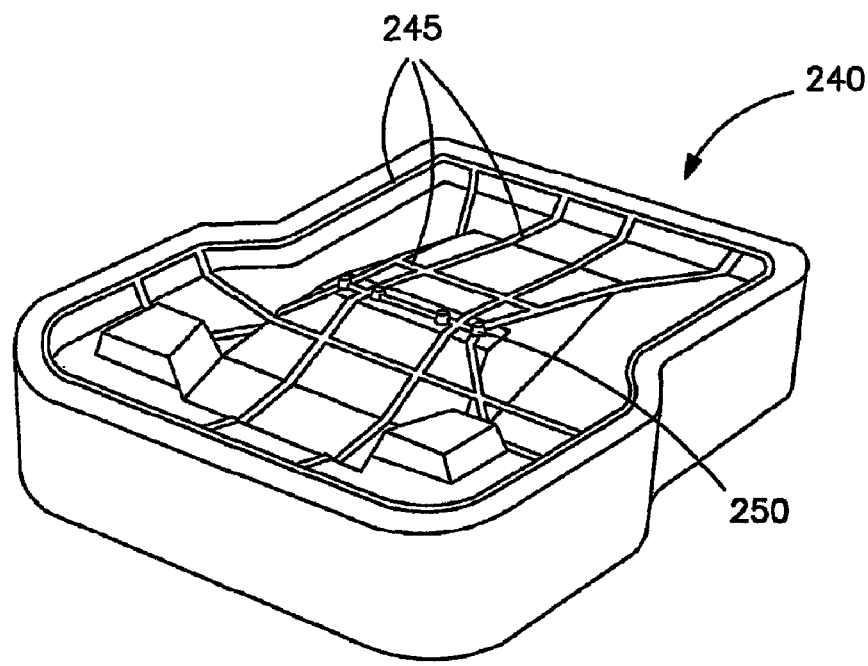
FIG. 10 illustrates a perspective view of the foam article made using the mold illustrated in FIGS. 8 and 9.

The resulting foam part 240 is shown in FIG. 10. By adopting the combination of network 225 and vents 220, foam part 240 can be produced with virtually no underfill or voiding. Further, as shown in FIG. 10 foam part 240 comprises a "negative" of network 225 on the B-surface thereof in the form of a network 245 of foam ridge. In essence, foam part 240 is completely trim-free and can be sent to trim cover operations without the need to remove flash or other excess materials.

Figure 11:
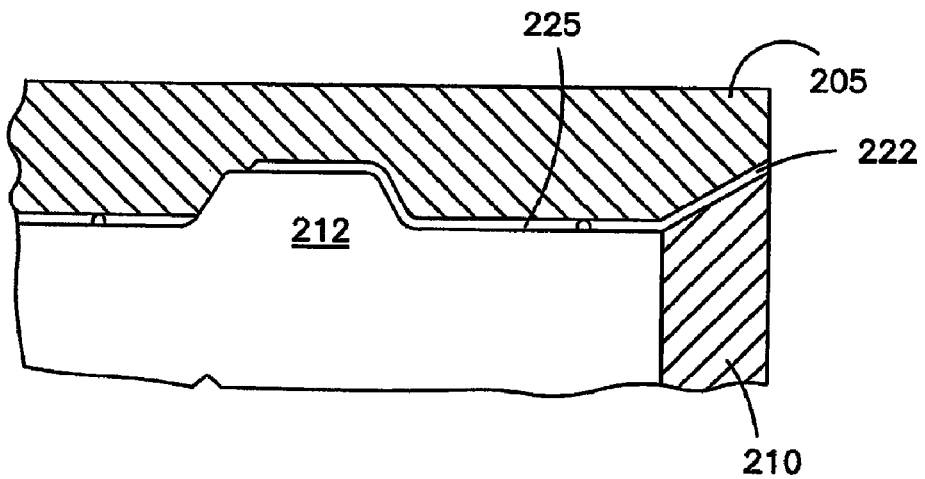
FIG. 11 illustrates an enlarged sectional view of a modification of the mold illustrated in FIG. 8.

With reference to FIG. 11, there is illustrated adaptation of network 225 of grooves/slots to a parting line or so-called "ribbon vent". In this case, vent 220 has been replaced with a ribbon vent 222 similar to the one described in Clark et al. patents discussed above. Further, network 225 of grooves/slots has been extended to rise to a peak 212 of the mold cavity.

Figure 12:
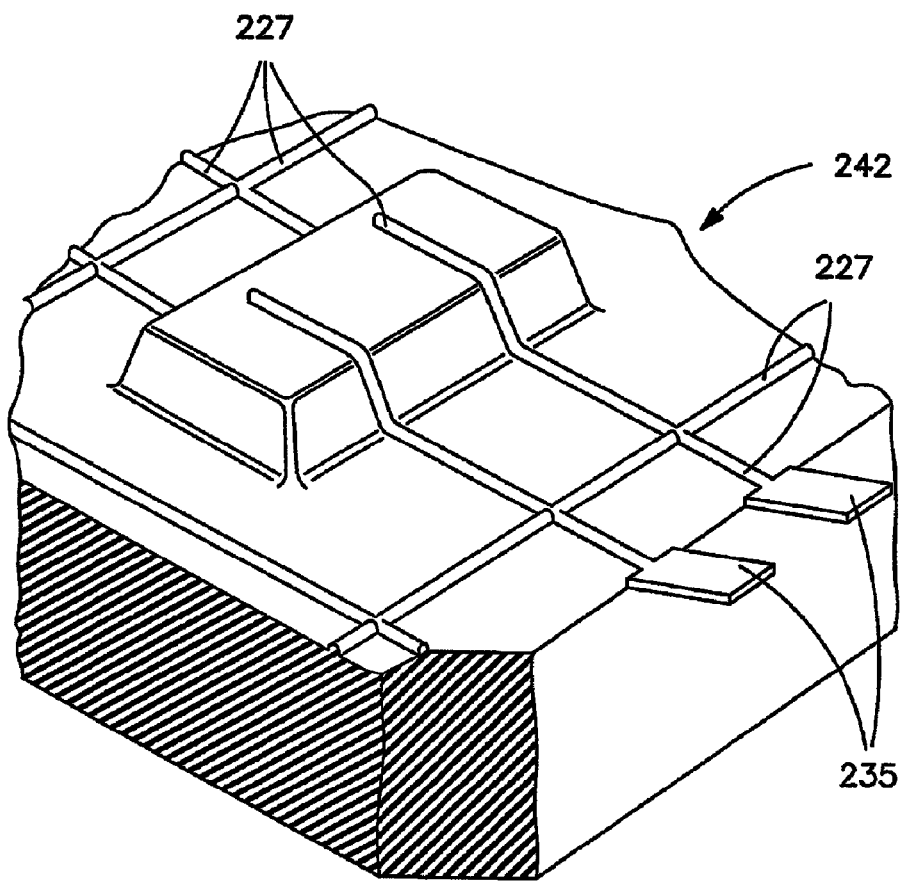
FIG. 12 illustrates an enlarged portion of a foam product made using the mold illustrated in FIG. 11.

The resulting part 242 is shown in FIG. 12 where a "negative" 227 of network 225 has been produced—i.e., the "negative" is simply a network 227 of molded foam ridges which filled network 225 during expansion of foamable composition 235. As shown in FIG. 12, foam element 242 comprises a series of ribbons 235 produced in ribbons vents 220.

Figure 13:
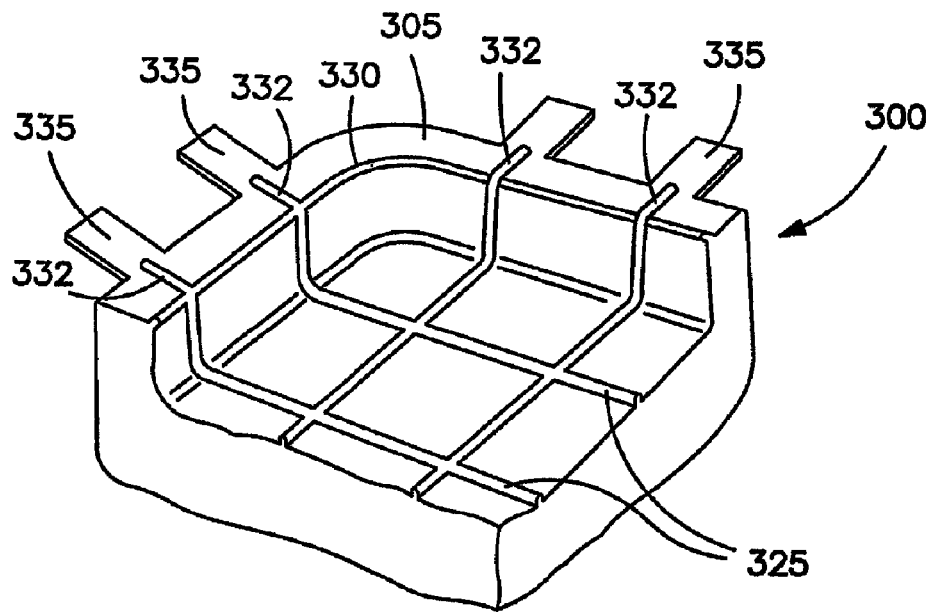
FIGS. 13-16 illustrate various foam articles made according to variations in the network of grooves made to the present mold.
Figure 14:
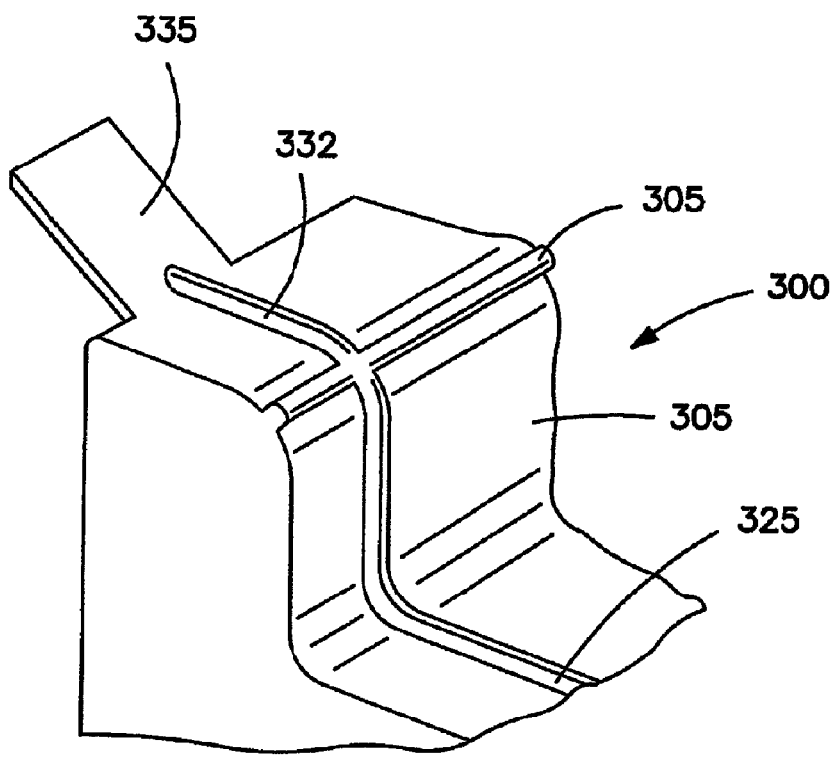

With reference to FIGS. 13 and 14, there is illustrated sectional and enlarged sectional perspective views of a foam part 300 made in accordance with the present mold. For ease of illustration and understanding, the resulting foam part is illustrated. However, those of skill in the art will understand based on this specification that these foam parts were made using the network or grid-like orientation of groove/slots. Thus, foam part 300 comprises a lip (or raised edge) 305. As shown, network 325 of foam ridges includes a peripheral foam ridge 330 connected with network 325. In this case, a series of connecting foam ridges 332 interconnect peripheral ridge 330 to a number ribbons 335. Network 325, peripheral foam ridge 330 and connecting foam ridges 332 are produced by a complementary network of grooves/slots.

Figure 15:
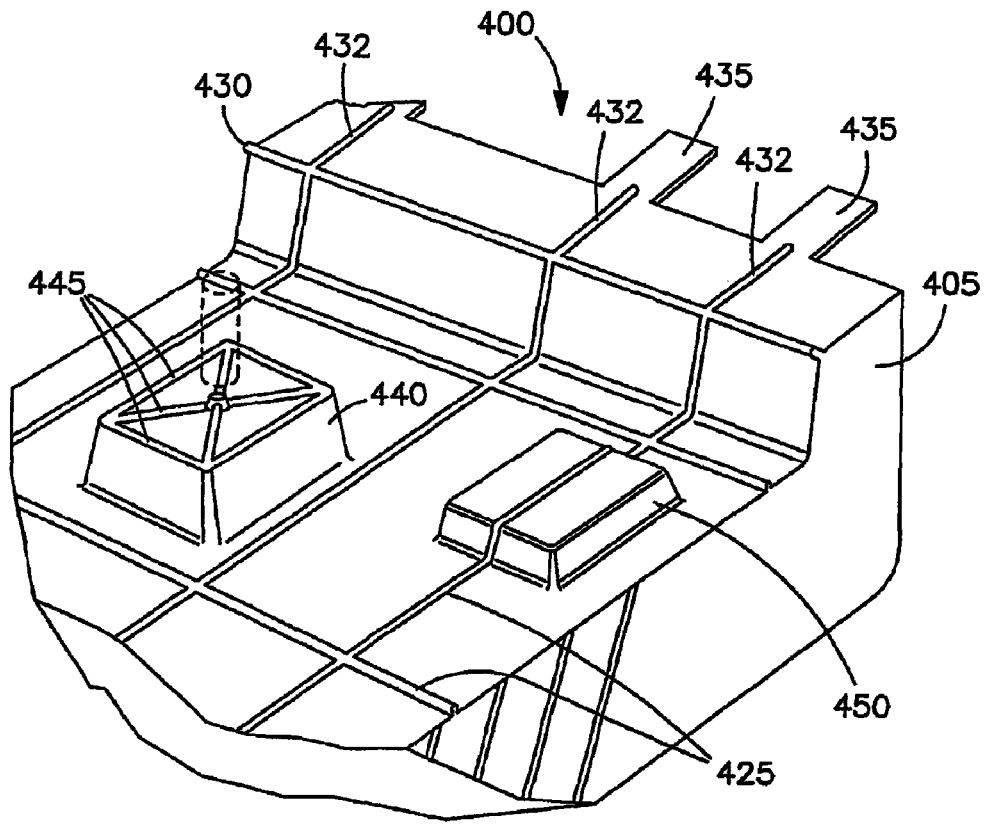

With reference to FIG. 15, there is illustrated a foam element 400 comprising a lip portion 405 and a network 425 of ridges produced from complementary grooves/slots in a mold in accordance with the present invention. Foam part 400 further comprises a peripheral ridge 430 formed from a complementary groove/slot in a mold according to the present invention. Foam part 400 further comprises connecting ridges 432 formed from complementary grooves/slots which connect to ribbon vents (not shown) in the manner discussed above. These ribbon vents result in production of ribbons 435 as discussed above.

The B-surface of foam part 400 comprises a raised section 440. Raised section 440 has a localized network 445 of ridges formed from a complementary network of grooves/slots in the mold according to the invention. Since network 445 is isolated from network 425, a vent (shown in ghosted outline above section 440) is used to facilitate venting of the mold cavity corresponding to the region defined by section 440. Provision of isolated network 445 and a separate vent allow for the production of raised section 440 without the occurrence of underfill or voids—i.e., this notwithstanding the fact that raised section 440 is highly contoured and is almost right-angled with respect to the major portion of the B-surface of foam part 400.

Foam part 400 further comprises a raised section 450 which is shorter than raised section 440. To achieve proper venting of the section of the mold cavity corresponding to raised section 450 without the occurrence of voids or underfill, a portion of the network of grooves/slots in the mold is disposed on the portion of the mold cavity corresponding to raised portion 450 so that this portion of the mold cavity is vented via the network of grooves/slots resulting in the production of network 425.

Figure 16:
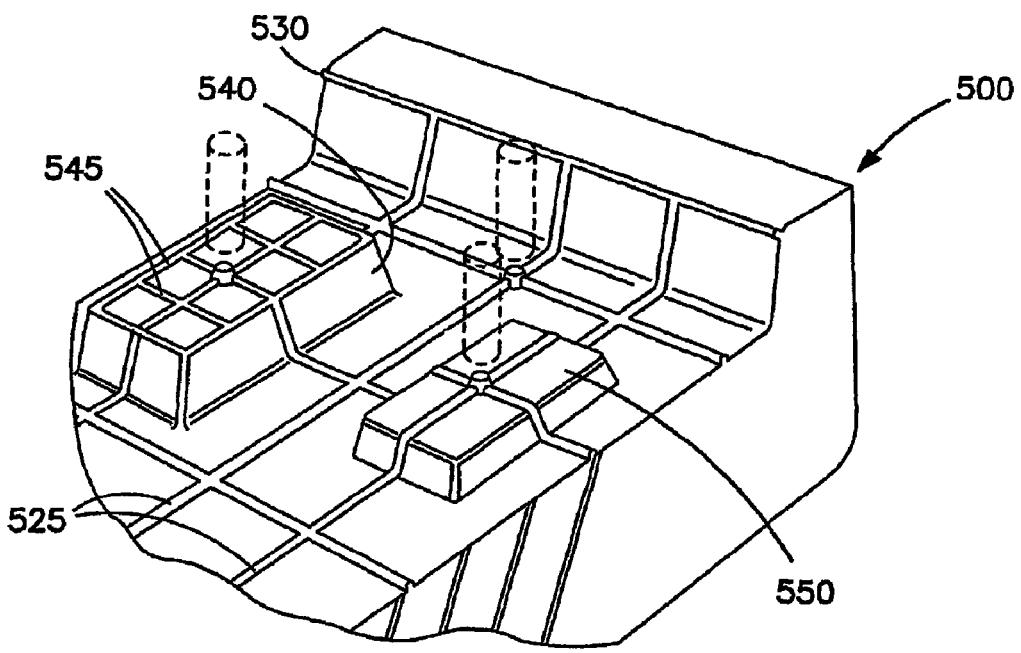

FIG. 16 illustrates a foam part 500 having a higher raised section 540 and a lower raised section 550 similar to those shown in FIG. 15 with respect to foam part 400. In the case of foam part 500, peripheral ridge 530 and the ridges of "main" network 525 and the ridges of network 545 are all interconnected thereby obviating the need for connecting ridges and ribbons, including obviating the need for ribbon vents in the mold used to produce foam part 500. Rather, autovent vents or the like can be used at the location shown in ghosted outline shown in FIG. 16 to achieve effective area venting of the mold cavity.

Figure 18:
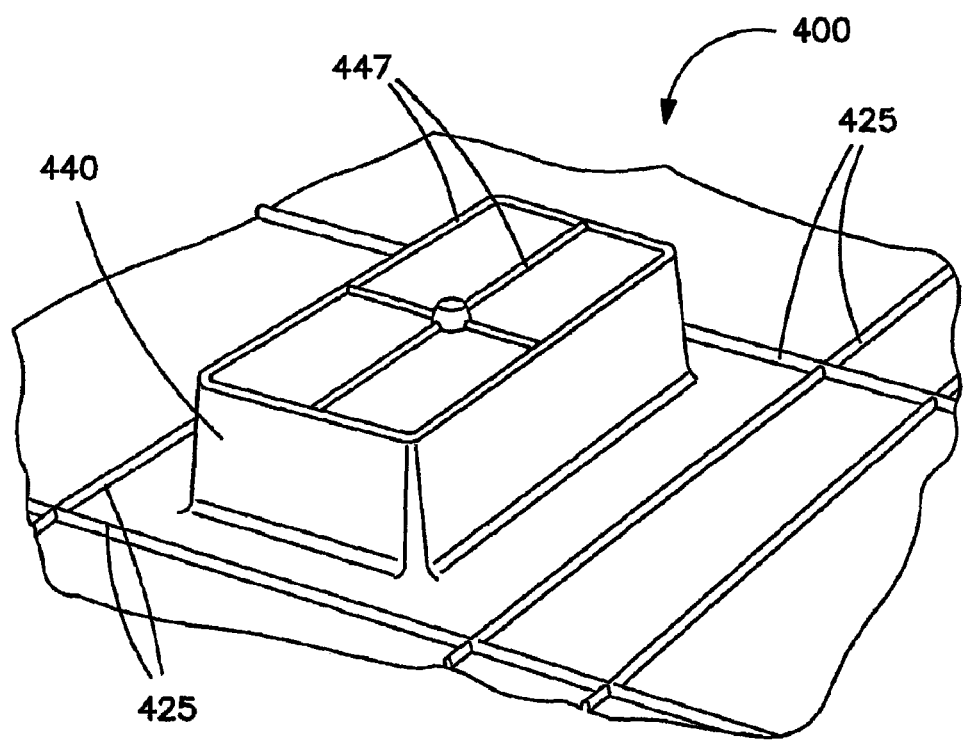
FIG. 18 illustrates an enlarged view a foam product made using the mold illustrated in FIG. 17.

FIG. 18 shows an enlarged portion of a slightly modified version of element 400 wherein "mini" network 447 of ridges has been slightly modified compared to "mini" network 445 in FIG. 15.

Figure 17:
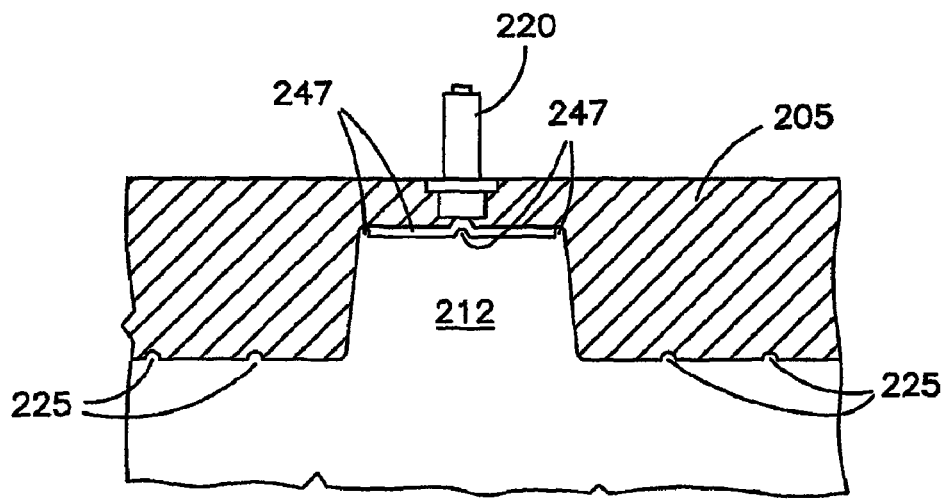
FIG. 17 illustrates an enlarged sectional view of another embodiment of the present mold.

FIG. 17 illustrates an enlarged section view of a portion of the mold used to produced element 400 shown in FIG. 18. Thus, a "main" network of grooves/slots is provided and is connected to a peripheral groove/slot, connected grooves/slots and ribbon vent as discussed above. Peak 212 of lid 205 is provided with a "mini" network 247 of grooves/slots which are interconnected and isolated with respect to "main" network 225. "Mini" network 247 of grooves-slots is connected to a vent 220 as discussed above.

Thus, in operation, gases in the main portion of the mold cavity will be vented via "main" network 225 of grooves/slots, peripheral groove/slot, connection grooves/slots and ribbon vents (all not shown in FIG. 17 but referred to above) whereas gas that may be trapped in peak 212 will be vented via "mini" network 247 of grooves/slots and vent 220.

With reference to FIG. 20, there is shown a schematic representation of connection of vent 220 to lid 205 of mold 200. Thus, vent 220 comprises a threaded portion 221. Lid 205 comprises an internally threaded portion 206 which compleents threaded portion 221 of vent 220. Thus, vent 220 is simply threaded into lid 205 via threaded portions 206 and 221.

Vent 220 can take a number of different forms. Thus, with reference to FIG. 20, there is shown a large sectional view of a vent 600 disposed in lid 205. Vent 600 maybe constructed in a manner similar to vent assembly 98 described in the Clark et. al patents.

With reference to FIGS. 21, 22 and 25-28, there is illustrated an alternate vent 700 which may be used in place of and/or in addition to one or both of vents 220 and 600 discussed above.

Thus, vent 700 comprises a threaded section 721 which maybe engaged with a complementary threaded section (not shown) in lid 205 as discussed above with reference to FIG. 19.

Figure 21:
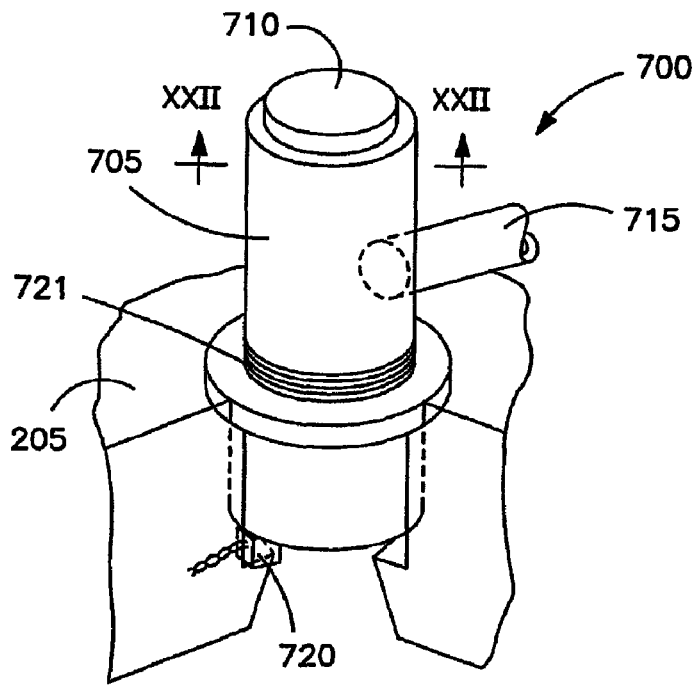
FIG. 21 illustrates an enlarged perspective view of a first preferred vent installed in the present mold.

Vent 700 comprises a passageway 705 in which is disposed an obstruction 710. Branching off of passageway 705 is a conduit 715. Disposed below vent 700 is a pair of opposed sensor elements 720 (only one is shown in FIG. 21). Sensor element 720 maybe an optical sensor (e.g., infrared and the like), an acoustical sensor, a capacitance sensor and the like.

The operation of vent 700 will now be discussed with reference to FIGS. 25-28.

Figure 27:
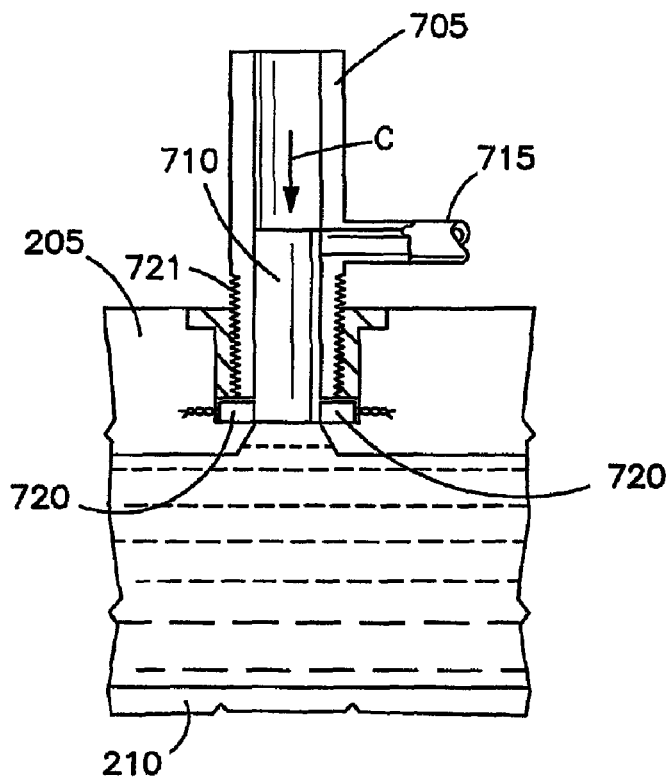
Figure 28:
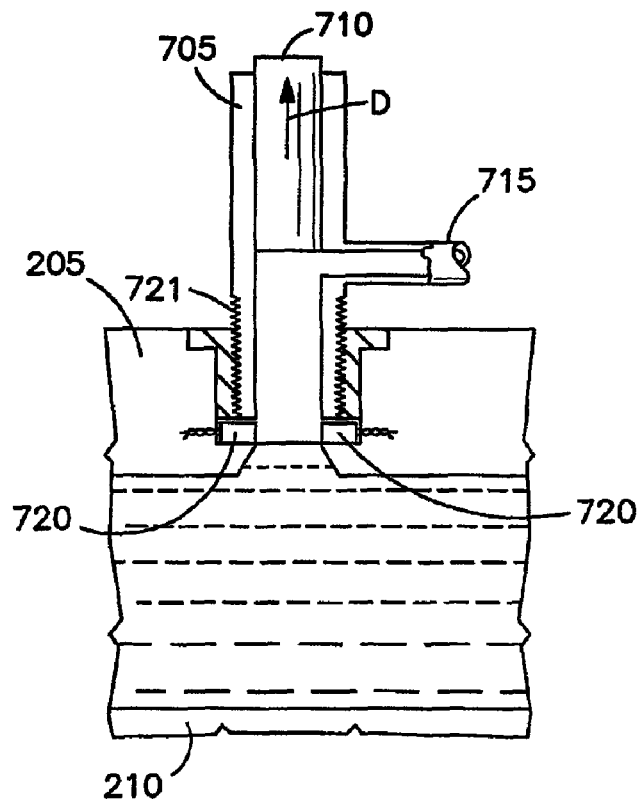

Thus, a liquid foamable composition 235 is dispensed in bowl 210 of mold 200 as discussed above with reference to FIG. 8. Lid 205 is then closed with respect to bowl 210. As foamable composition 235 expands, gases are produced and exit vent 700 via conduit 715 following the path of arrows B. As foamable composition 235 fills the mold cavity, it reaches sensors 720 in vent 700. When this happens, obstruction 710 is actuated to move in the direction of arrow C thereby effectively closing off escape of gas via conduit 715—i.e., vent 700 is, for all intents and purposes, closed (FIG. 27).

Thereafter, obstruction 710 is moved in the direction of arrow D and the resulting foam part is demolded as discussed above. Alternatively, the resulting foam part can be demolded and then obstruction 710 can be moved in the direction of arrow D in readiness for production of next foam part.

Thus, those of skill in the art will understand that vent 700 operates as a relatively high capacity vent which has a sensor-actuated shut off system effectively sealing off escape of gas through the vent. In other words, vent 700 is operable between a first position in which it operates as a high capacity vent and a second position in which the vent is effectively sealed.

Figure 23:
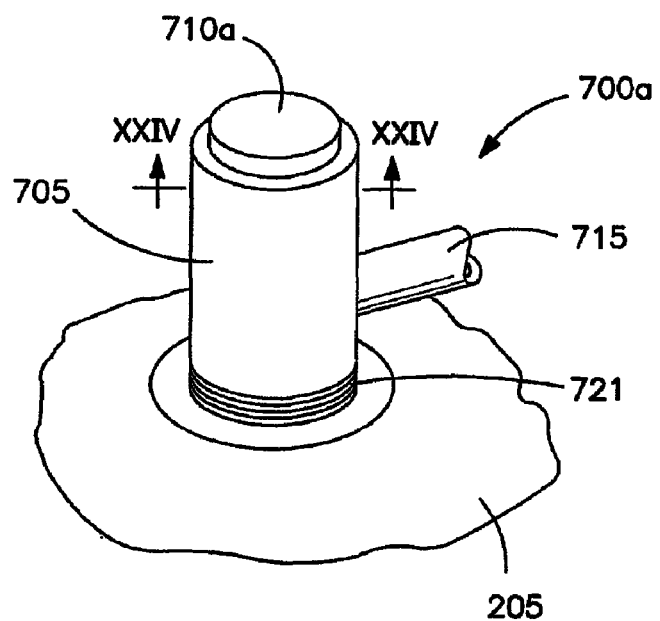
FIG. 23 illustrates an enlarged perspective view of a second preferred vent in FIG. 20 installed in the present mold.
Figure 25:
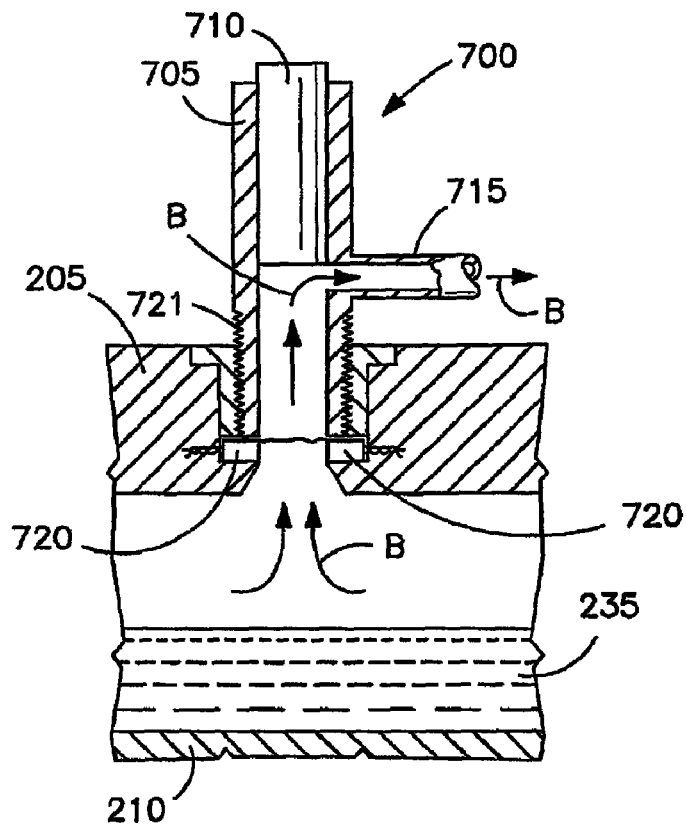
FIGS. 25-28 illustrate operation of the vent shown in FIGS. 21-22.
Figure 26:
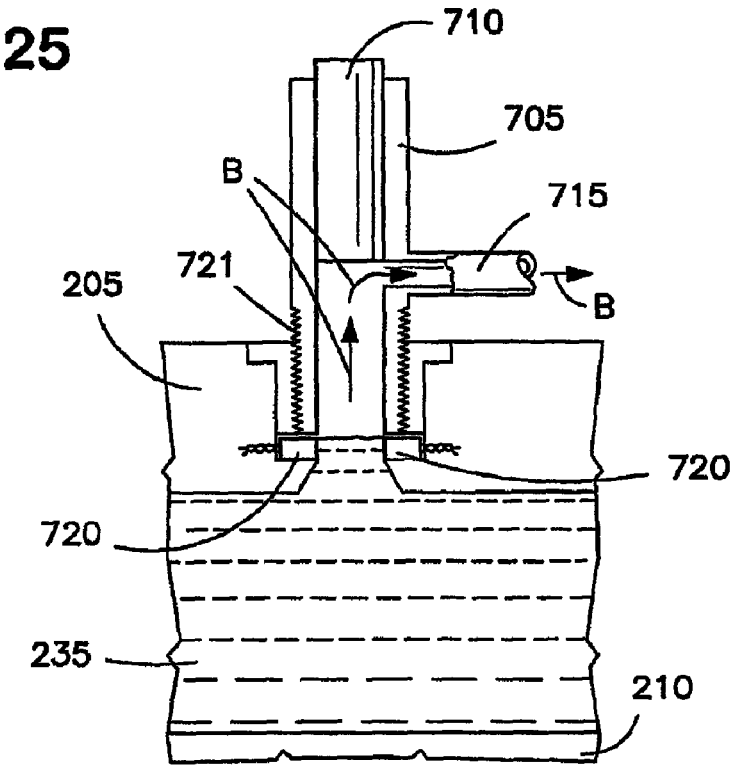

An alternative to this approach is illustrated with respect to a modification of vent 700 to vent 700a shown in FIGS. 23-24. In FIGS. 23-24, the only significant change in vent 700a is replacement of obstruction 710 with obstruction 710a.

Obstruction 710a is similar to the obstruction appearing in vent 600 described above and vent assembly 98 described in the Clark et. al patents. Obstruction 710a is actuated in the same manner as described with reference to obstruction 710 in FIGS. 25-28.

The resulting difference is that, unlike vent 700 illustrated in FIGS. 25-28, vent 700a illustrated in FIGS. 23-24 is operable between a first position in which the vent acts as a relatively high capacity, active vent and a second position in which the vent acts as low capacity, passive vent (i.e., in the second position the vent is not effectively sealed off as it is in the embodiment described with reference to FIGS. 25-28). The advantage of this approach is that the number of vents needed is reduced (as was the case with vent 700) since the vent in FIGS. 23-24 operates as a high capacity vent in the first position while, on the other hand, the need to use precise timing to close off the vent as shown in FIGS. 25-28 is alleviated with vent 700a shown in FIGS. 23-24 since gas will continue to escape the vent even after obstruction 705 is actuated to be in the second (low capacity, passive vent) position.

In some cases, this can obviate the need for sensors 720 where the same part is being produced in the same mold. Specifically, a timing system can be used to move obstruction 710a from its first (high capacity, active vent) position to its second (low capacity, passive vent) position.

With reference to FIG. 29, there is illustrated an enlarged view of a portion of foam part 240 (see also FIG. 10) comprising a portion of network 245 of foam ridge element formed by network 225 of grooves/slots in mold 200. Further, an extruded section 250 is shown where foam cured near vent 220, 600, 700 and/or 700*a*.

Advantageous features include a mold for producing molded articles, the mold comprising a first mold and a second mold releasingly engageable between an open position and a closed position, the closed position defining a mold cavity, a surface of the mold cavity comprising at least one groove connected to at least one vent, the at least one vent comprising a passageway for gas to escape from the mold cavity. The vent may be disposed in the first mold. The vent may be disposed in the second mold. The vent may be disposed in a partline between the first mold and the second mold. The groove may be connected to a plurality of vents. The plurality of vents may be disposed in the first mold. The plurality of vents may be disposed in the second mold. The surface of the mold cavity may comprise a plurality of grooves. The surface of the mold cavity may comprise a plurality of grooves disposed in the first mold. The surface of the mold cavity may comprise a plurality of grooves disposed in the second mold. The plurality of grooves may be arranged to define a network of grooves. The plurality of grooves may be connected to a plurality of vents. The groove may be disposed in a periphery of the first mold. The groove may be disposed in a periphery of the second mold.

The first mold may comprise a lid, and the second mold may comprise a bowl. The lid may comprise a contoured surface. The countered surface may comprise at least one peak region and one valley region. The groove may be disposed in the at least one peak region. The groove may be disposed in the at least one valley region. The groove may be disposed in the at least one peak region and the at least one valley region. A first plurality of grooves may be disposed in the at least one peak region and a second plurality of grooves may be disposed in the at least one valley region. The first plurality of grooves and the second plurality of grooves may be interconnected. The first plurality of grooves and the second plurality of grooves may be isolated with respect to one another. The vent may be disposed in the at least one peak region. The vent may be disposed in the at least one valley region. A first vent may be disposed in the at least one peak region and a second vent may be disposed in the at least one valley region. The groove may comprise an curvilinear cross-section. The groove may comprise a substantially U-shaped cross-section. The groove may comprise a substantially semi-circular cross-section. The groove may comprise a rectilinear cross-section. The groove may comprise a substantially V-shaped cross-section. The groove may have a cross-section comprising a pair of side walls interconnect by an apex portion. The side walls may be parallel. The side walls may be non-parallel. The side walls may be angled with respect to one another. The side walls may be angled with respect to one another to define an acute angle. The side walls may be angled with respect to one another to define an obtuse angle. The side walls may be angled with respect to one another to define right angle. The apex portion may be curved. The apex portion may be non-curved. The apex portion may be pointed. The apex portion may be flat.

The groove may be dimensioned to have a depth and a width, the depth being greater than or equal to the width. The groove may be dimensioned to have a depth and a width, the depth being substantially equal to the width. The groove may be dimensioned to have a depth and a width, the depth being greater than the width. The groove may be dimensioned to have a depth of up to about 10 mm and a width of up to about 5 mm. The groove may be dimensioned to have a depth in the range of from about 3 mm to about 10 mm and a width in the range of from about 0.5 mm to about 5 mm. The groove may be dimensioned to have a depth in the range of from about 3 mm to about 7 mm and a width in the range of from about 1 mm to about 4 mm. The groove may be dimensioned to have a depth in the range of from about 4 mm to about 6 mm and a width in the range of from about 1.5 mm to about 2.5 mm. The groove may be dimensioned to have a depth of about 5 mm and a width of about 2 mm.

The vent may comprise a passageway and an obstruction in the passageway, the obstruction and the passageway combining to form at least one opening. The vent may comprise a passageway and an obstruction in the passageway, the obstruction and the passageway combining to form a plurality of openings. The opening may have a substantially segment-shaped cross-section. The passageway and the obstruction may be movable between a retracted first position and an extended second position. The vent may have a greater capacity to allow gas to escape from the mold cavity in the first position than in the second position. The vent may comprise a passageway and an obstruction in the passageway, the passageway and the obstruction being movable with respect to one another between a first position in which gas may be allowed to escape from the mold cavity and a second position in which the vent may be substantially closed with respect to escape of gas from the mold cavity. The vent may be disposed in a partline of first mold and the second mold to define an opening having maximum dimension and a minimum dimension. The minimum dimension may be in the range of from about 0.05 mm (0.002 inches) to about 0.75 mm (0.030 inches). The minimum dimension may be in the range of from about 0.13 mm (0.005 inches) to about 0.50 mm (0.020 inches). The opening may be rectangular in cross-section.

Advantageous features also include a mold for producing molded articles, the mold comprising a lid and a bowl releasingly engageable to define a mold cavity, the lid comprising: (i) a vent having a passageway for gas to escape from the mold cavity, and (ii) a plurality of grooves connected to the vent. Advantageous features further include a device for producing molded articles, the device comprising a lid and a bowl releasingly engageable between an open position and a closed position, the closed position defining a mold cavity, at least one of the lid and the bowl comprising: (i) a plurality of vents, each vent having a passageway for gas to escape from the mold cavity, and (ii) a plurality of interconnected grooves arranged to be in fluid communication with the plurality of vents. Advantageous features further include a process for producing a molded part comprising the steps of: (i) dispensing a moldable composition in one of the first mold and the second mold; (ii) translating gas in the mold cavity to the least one groove, (iii) translating gas from the at least one groove to the passageway of the vent; (iv) substantially filling the mold cavity with the moldable composition, and (v) allowing gas to escape from the passageway of the vent to an exterior of the mold. The mold may be in the open position during Step (i) and in the closed position during Step (iv).

Advantageous features may also include a process for producing a molded part comprising the steps of: (i) dispensing a moldable composition in the bowl; (ii) translating gas in the mold cavity to the plurality of grooves, (iii) translating gas from the plurality of grooves to the passageway of the vent; (iv) substantially filling the mold cavity with the moldable composition, and (v) allowing gas to escape from the passageway of the vent to an exterior of the mold. The mold may be in an open position during Step (i) and in a closed position during Step (iv). Advantageous features may further include a process for producing a molded part comprising the steps of:

(i) dispensing a moldable composition in the bowl; (ii) translating gas in the mold cavity to the plurality of interconnected grooves, (iii) translating gas from the plurality of interconnected grooves to the plurality of vents; (iv) substantially filling the mold cavity with the moldable composition, and (v) allowing gas to escape from the plurality of vents to an exterior of the device. The mold may be in the open position during Step (i) and in the closed position during Step (iv). The process may comprise dispensing a liquid foamable composition. The process may comprise dispensing a liquid foamable polyurethane composition.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to modify lid 205 of mold 200 to modify the shape and/or dimension of extruded portion 250 in resulting foam part 240. Alternatively, it is possible to modify lid 205 of mold 200 to eliminate production of extruded portion 250 in resulting foam part 240. Still further, it is possible to modify interconnection of vents 220, 600, 700 and/or 700*a* to lid 205 such that the distal portion of vents 220, 600, 700 and/or 700*a* is substantially flush with the mold cavity surface of lid 205. Still further, it is possible to modify the network of grooves/slots 225 to have a different design. For example, it is possible to design a network of grooves/slots to include a diamond-shaped repeating pattern, optionally including a series of substantially parallel grooves/slots wherein each groove/slot bisects a row of diamonds in the repeating pattern. Alternatively, it is possible to design a network of grooves/slots to include a series of substantially parallel grooves/slots (i.e., in a so-called radiator type arrangement with a spacing between adjacent pairs of grooves/slots in the range of from about 2 cm to about 5 cm). In each case, it is preferred to included a perimeter groove/slot connected to the network of grooves/slots, more preferably connected to each groove/slot in the network. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A mold for producing molded foam articles, the mold comprising:
    a first mold portion and a second portion mold releasingly engageable with respect to each other between an open position and a closed position, the closed position defining a mold cavity, a surface of the mold cavity comprising at least one vent;
    wherein the vent comprises a primary opening and an obstruction, the obstruction being movable in a passageway with respect to the primary opening between (i) a first position in which gas is allowed to escape from the mold cavity via the primary opening when foam is expanding in the mold cavity and (ii) a second position in which the obstruction blocks the primary opening when foam is expanding in the mold cavity;
    wherein the obstruction and the passageway combine to form at least one secondary opening; and
    wherein the gas is allowed to escape through the at least one secondary opening in the second position.

2. The mold defined in claim 1, further comprising a sensor for sensing the presence of a predetermined amount of moldable material in the mold cavity, the sensor configured to actuate the obstruction from the first position to the second position when the predetermined amount of moldable material is detected.

3. The mold defined in claim 1, further comprising a sensor for sensing the presence of a predetermined level of moldable material in the mold cavity, the sensor configured to actuate the obstruction from the first position to the second position when the predetermined level of moldable material is detected.

4. The mold defined in any one of claims 2 or 3, wherein the sensor comprises an optical sensor.

5. The mold defined in any one of claims 2 or 3, wherein the sensor comprises an infrared sensor.

6. The mold defined in any one of claims 2 or 3, wherein the sensor comprises an acoustical sensor.

7. The mold defined in any one of claims 2 or 3, wherein the sensor comprises capacitance sensor.

8. The mold defined in any one of claims 2 or 3, wherein the sensor comprises a pair of sensor elements.

9. The mold defined in any one of claims 2 or 3, wherein the sensor comprises a pair of substantially opposed sensor elements.

10. The mold defined in any one of claims 2 or 3, wherein the obstruction is reversibly movable in the passageway.

11. The mold defined in claim 10, wherein the primary opening is disposed in a surface of the passageway.

12. The mold defined in claim 1 wherein the at least one secondary opening has a substantially segment-shaped cross-section.

13. The mold defined in claim 10, wherein the obstruction and the passageway combine to form a plurality of secondary openings.

* * * * *